United States Patent
Crawford et al.

(10) Patent No.: US 10,080,987 B1
(45) Date of Patent: Sep. 25, 2018

(54) HIGH RECYCLE/RECLAIMED ASPHALT HOT MIX ASPHALT SYSTEM AND GAS TREATMENT PROCESS

(71) Applicant: Crowley Chemical Company, Inc., New York, NY (US)

(72) Inventors: Kenneth Crawford, West Chester, PA (US); John DeRosa, West Chester, PA (US)

(73) Assignee: Crowley Chemical Company, Inc., New York, NY (US)

( * ) Notice: Subject to any disclaimer, the term of this patent is extended or adjusted under 35 U.S.C. 154(b) by 358 days.

(21) Appl. No.: 14/632,932

(22) Filed: Feb. 26, 2015

Related U.S. Application Data

(60) Provisional application No. 61/945,036, filed on Feb. 26, 2014.

(51) Int. Cl.
  *B01D 45/16*   (2006.01)
  *F26B 11/02*   (2006.01)
  *E01C 19/10*   (2006.01)

(52) U.S. Cl.
  CPC .............. *B01D 45/16* (2013.01); *E01C 19/10* (2013.01); *E01C 19/1004* (2013.01); *E01C 19/1009* (2013.01); *E01C 19/1059* (2013.01); *F26B 11/028* (2013.01)

(58) Field of Classification Search
  CPC ............. E01C 19/1004; E01C 19/1009; E01C 19/1059; E01C 19/10; F26B 11/028; B01D 45/16
  See application file for complete search history.

(56) References Cited

U.S. PATENT DOCUMENTS

| | | | | |
|---|---|---|---|---|
| 1,620,813 | A | * | 3/1927 | Forrester ............. E01C 19/1009 106/280 |
| 2,610,944 | A | * | 9/1952 | Hemminger ............ C10B 49/10 201/31 |
| 2,874,093 | A | * | 2/1959 | Moser, Jr. ................ C10G 9/32 208/127 |
| 3,106,384 | A | * | 10/1963 | Preeman ............. E01C 19/1072 198/530 |
| 3,800,429 | A | * | 4/1974 | Lindl ........................ B04C 5/30 34/591 |
| 3,809,373 | A | * | 5/1974 | Brock ..................... E01C 19/05 209/129 |
| 3,942,970 | A | * | 3/1976 | O'Donnell ................ C02F 1/50 210/609 |
| 3,999,743 | A | * | 12/1976 | Mendenhall ........ E01C 19/1036 106/284.01 |
| RE29,496 | E | * | 12/1977 | Dydzyk .................. E01C 19/05 366/25 |
| 4,103,350 | A | * | 7/1978 | Brock ................. E01C 19/1031 106/281.1 |

(Continued)

*Primary Examiner* — Tony G Shoohoo
(74) *Attorney, Agent, or Firm* — Gehrke & Associates, SC; Lisa M. Gehrke

(57) ABSTRACT

The present disclosure provides an improved system and process for the production of Hot Mix Asphalt containing High Recycle/Reclaimed Asphalt. Unlike conventional processing systems, the presently disclosed system utilizes a combination of dryer design and cyclone and wet scrubber technology to remove dust, particulate matter and oil residue from hot gas emissions produced during the process and recycles it back into the system.

14 Claims, 6 Drawing Sheets

(56) References Cited

U.S. PATENT DOCUMENTS

| | | | | |
|---|---|---|---|---|
| 4,361,406 A | * | 11/1982 | Loggins, Jr. | E01C 19/1036 366/25 |
| 4,477,250 A | * | 10/1984 | Brashears | E01C 19/1036 126/343.5 A |
| RE31,904 E | * | 6/1985 | Mendenhall | B01F 15/063 366/25 |
| RE31,905 E | * | 6/1985 | Mendenhall | C08L 95/00 106/281.1 |
| 4,522,498 A | * | 6/1985 | Mendehall | E01C 19/1027 366/228 |
| 4,555,182 A | * | 11/1985 | Mendenhall | E01C 19/1036 366/23 |
| 4,579,458 A | * | 4/1986 | Ohlson | C04B 26/26 366/17 |
| 4,868,999 A | * | 9/1989 | Radomsky | E01C 19/05 34/127 |
| 4,892,411 A | * | 1/1990 | Elliott | E01C 19/1036 34/131 |
| 4,921,730 A | * | 5/1990 | Sasaki | E01C 19/1004 106/281.1 |
| 5,090,813 A | * | 2/1992 | McFarland | E01C 19/1036 366/23 |
| 5,174,650 A | * | 12/1992 | McFarland | E01C 19/1036 366/23 |
| 5,273,355 A | * | 12/1993 | May | B09B 3/0033 110/226 |
| 5,334,012 A | * | 8/1994 | Brock | E01C 19/1036 119/244 |
| 5,520,124 A | * | 5/1996 | Amon | E01C 19/10 110/246 |
| 5,579,587 A | * | 12/1996 | Morrison | E01C 19/1036 34/135 |
| 5,596,935 A | * | 1/1997 | Swanson | B09C 1/06 110/235 |
| 5,967,065 A | * | 10/1999 | Amon | E01C 19/10 110/226 |
| 6,083,431 A | * | 7/2000 | Ikari | A62D 3/33 264/11 |
| 6,656,242 B1 | * | 12/2003 | Golightly | B01D 50/00 366/22 |
| 7,566,162 B1 | * | 7/2009 | Swanson | C08L 95/00 366/15 |
| 8,220,982 B2 | * | 7/2012 | Musil | E01C 19/05 366/23 |
| 8,646,964 B1 | * | 2/2014 | Anderson | E01C 19/1004 366/7 |
| 2003/0136747 A1 | * | 7/2003 | Wood | B09B 3/0091 210/774 |
| 2003/0143140 A1 | * | 7/2003 | Hwang | B01D 53/501 423/210 |

\* cited by examiner

HIGH RECYCLE/RECLAIMED ASPHALT HOT MIX ASPHALT SYSTEM AND GAS TREATMENT PROCESS

CROSS REFERENCE TO RELATED APPLICATION

The present application claims priority to Provisional U.S. Patent Application 61/945,036 filed on Feb. 26, 2014 and is incorporated herein by reference.

FIELD OF INVENTION

The present disclosure relates to systems and methods for use in the Hot Mix Asphalt (herein after HMA) industry where high levels of recycle/reclaimed materials are used.

BACKGROUND AND SUMMARY OF THE INVENTION

The treatment of waste materials and gas emissions continues to be a problem in both conventional and High Recycle/Reclaimed Asphalt HMA systems. Filtering methods such as, bag houses, quench scrubbers, cyclones, incinerators and combinations thereof, have all been used to treat gas streams produced during HMA production. Although these processes are useful, they do not address the environmental problems such as, harmful waste water streams, fire hazards, high energy consumption and high cost of operation, that result from their use.

The present disclosure provides an improved system and process for the production of High Recycle/Reclaimed Asphalt (greater than 50% binder replacement with recycle material) containing HMA. Unlike conventional processing systems, the presently disclosed system utilizes a combination of dryer design and cyclone and wet scrubber technology to remove dust, particulate matter and oil residue from hot gas emissions produced during the process and recycles it back into the system. What was traditionally a waste water stream that was directed outside of the system for further treatment, is now recycled back into the main process and used to treat coarse Recycled/Reclaimed Asphalt materials as they enter into the system dryer. As a result, the disclosed system and process is safer, cleaner and more cost effective than conventional High Recycle/Reclaim Asphalt HMA processes.

DEFINITIONS

As used herein, "coarse RAP" is generally greater than 4 millimeters in diameter (depending on mix design requirements)

As used herein, "RAP fines" is generally less than 2 millimeters in diameter (depending on mix design requirements)

As used herein, "dryer" refers to a parallel flow portable RAP dryer or its equivalent. The dryer has a first end and a second end and at least one aperture for receiving course RAP and, alternatively RAP fines. The dryer is heated with a burner positioned at the first end of the dryer.

As used herein, "pug mill" refers to a machine designed to mix the coarse RAP, RAP fines and other additives, such as asphalt and rejuvenation, into the final High Recycle/Reclaimed Asphalt product As used herein, "Cyclone separator" refers to a single high efficiency cyclone separator, a two stage cyclone separator or an equivalent.

As used herein, "scrubber" refers to a wet scrubber such as a venturi scrubber or an equivalent.

As used herein, "scrubber recycle stream" refers to the water stream containing particulate and oil residue recovered from the gas emissions treated by the cyclone and scrubber.

As used herein, "polishing system" refers to a polishing filter or equivalent polishing technology capable of removing residual oil droplet residue from the gas emissions as it exits the scrubber unit.

As used herein, "Blue Smoke" refers to bluish haze or smoke that tends to rise off of HMA. It is typically noticeable at a truck loading area as HMA is dumped from storage silos onto trucks for transportation to a job site. In some regions, Blue Smoke is subject to opacity restrictions and controls are required. Blue Smoke includes sub-micron oil droplets that currently can be removed by polishing filters where required. Blue smoke control requirements are becoming more prevalent.

DETAILED DESCRIPTION OF THE INVENTION

The disclosure of the present application is directed to an improved system and process for the production of High Recycle/Reclaimed Asphalt HMA. The process is appropriate for both High Reclaimed Asphalt (RAP) and Recycle Asphalt Shingles (RAS) separately or in combination. More specifically, the disclosed system eliminates the environmental problem of an external waste water stream through the recycling of waste materials collected with a cyclone and wet scrubber and returning them into the process through a scrubber stream.

Figure 1:
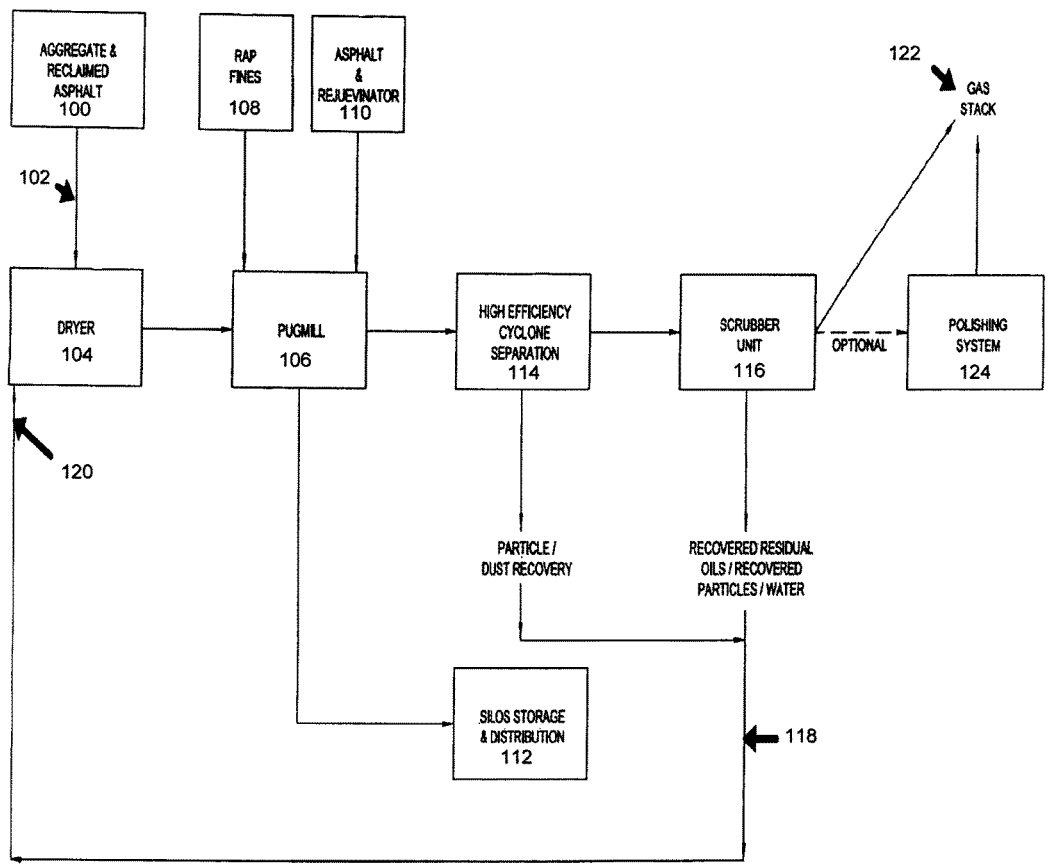
FIG. 1 is a flow chart illustrating High Recycle/Reclaimed Asphalt HMA system including a gas treatment process.
Figure 2:
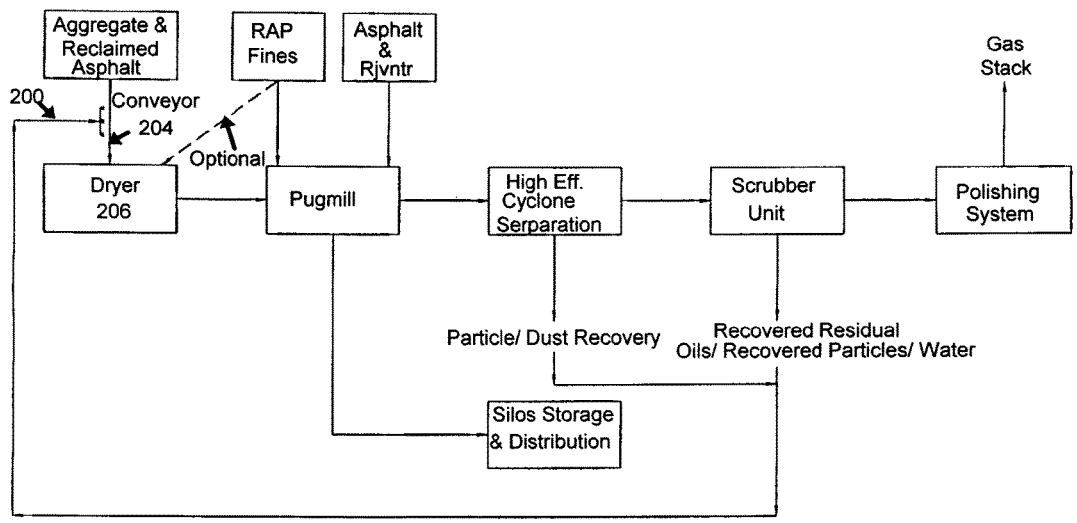
FIG. 2 is a flow chart illustrating an alternative embodiment of the system in FIG. 1.

Referring now to FIG. 1, the disclosed process includes the steps as follows. Coarse RAP 100 is transported with a conveyor 102 or equivalent means into the front end of dryer 104. As the course RAP moves through the dryer, asphalt binder oil is distributed throughout the entire dryer and increases the capture and encapsulation of dust fed into the dryer or created during the drying process that keeps the dust in a solid aggregate phase. The course RAP then passes from the dryer into a pugmill 106 where it is combined with RAP fines 108 and additional asphalt and rejuvenation 110 in amounts, as needed. The RAP fines are preferably added directly to the pug mill to prevent them from being drawn into the dryer air stream, but they may also be added directed to the dryer as shown in FIG. 2. The mixed material is then moved from the pug mill to silos for storage or distribution 112. The hot gas emissions resulting from the process are then filtered through a cyclone separator 114 to eliminate dust particles and oil residue. Although a high efficiency cyclone is preferred, a two stage cyclone or equivalent device may be used. The remaining hot gas is then filtered through a wet scrubber 116, such as a venturi scrubber.

The scrubber water containing waste particles and oil residue is then collected and directed back to the front end of the dryer through a scrubber stream 118. The scrubber recycle stream (containing asphalt particles, water and residue oil) is then fed back into the dryer at an entry point 120 closest to the burner assembly. This enables the RAP feed stream to maintain a lower RAP particle temperature while in direct contact with high temperature burner gas. This is accomplished by maintaining enough particle surface water to keep the particles relatively cool as the burner gas temperature is reduced from evaporating water from the RAP. This "wet bulb effect" (meaning that when water evaporates, it cools) improves RAP asphalt processing and efficiency through reduced loss of oils from burning and volatilizing. Additionally or alternatively, the scrubber stream 200 is sprayed directly onto the coarse RAP material 202 as it is conveyed 204 into the dryer 206, as shown in FIG. 2.

Referring again to FIG. 1, waste materials recovered by the cyclone are also returned to the dryer through the scrubber recycle stream. Filtered hot gas exiting the scrubber is then released from the system through a gas stack 122 or, alternatively, passed through a polishing system 124 for further treatment before release through the gas stack.

Figure 3:
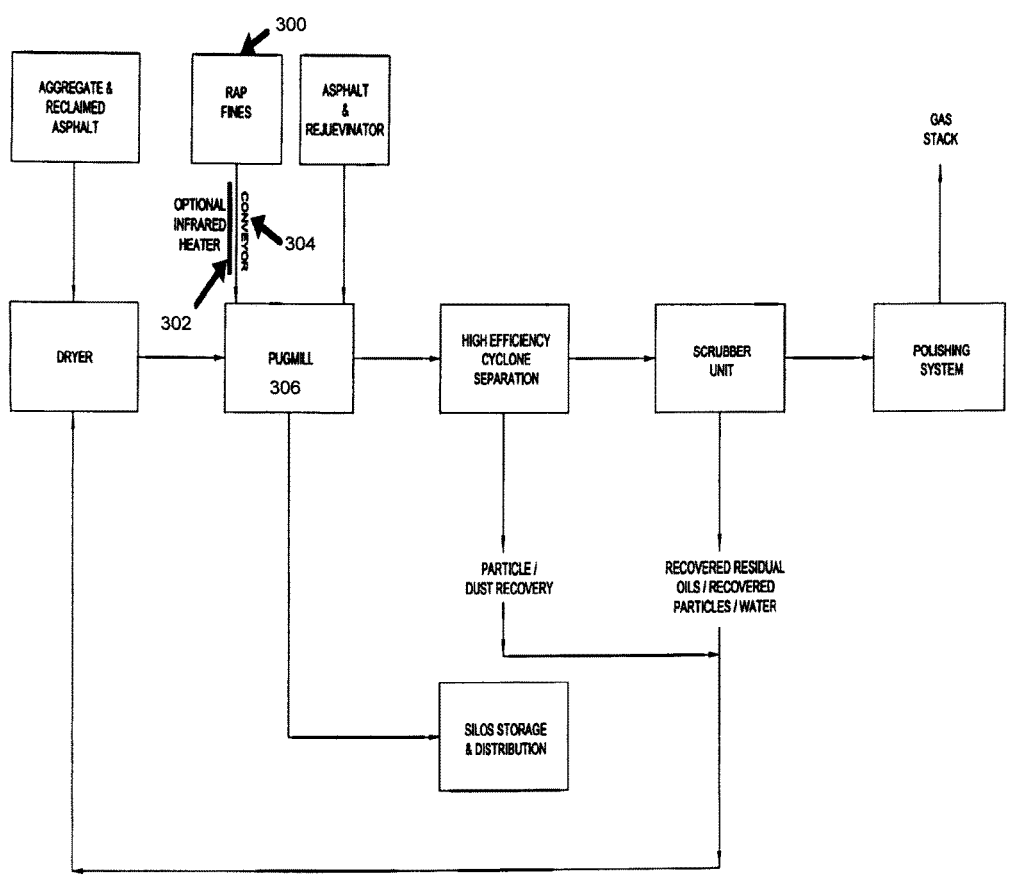
FIG. 3 is a flow chart illustrating another alternative embodiment of the system in FIG. 1.

Referring now to FIG. 3, RAP fines 300 may alternatively be treated with an infrared heater 302 mounted above the fines feed conveyor 304 as they are conveyed into the pugmill 306. This enhancement reduces the dust in the gas stream and resulting in more efficient heating of the overall system and also results in a greater material efficiency due to less oil being vaporized and taken into the gas stream. As a result, RAP fines added to the back end of the drying process are pre-dried to reduce moisture by approximately 50% using infrared heaters. Pre-drying the fines effectively allows for shifting water balance from the back of the dryer to the front and thus further reducing burner end dryer particle temperature and HMA exit end dryer gas temperatures that come in contact with back end fine RAP. This process does not require any additional chemicals or additives.

Figure 4:
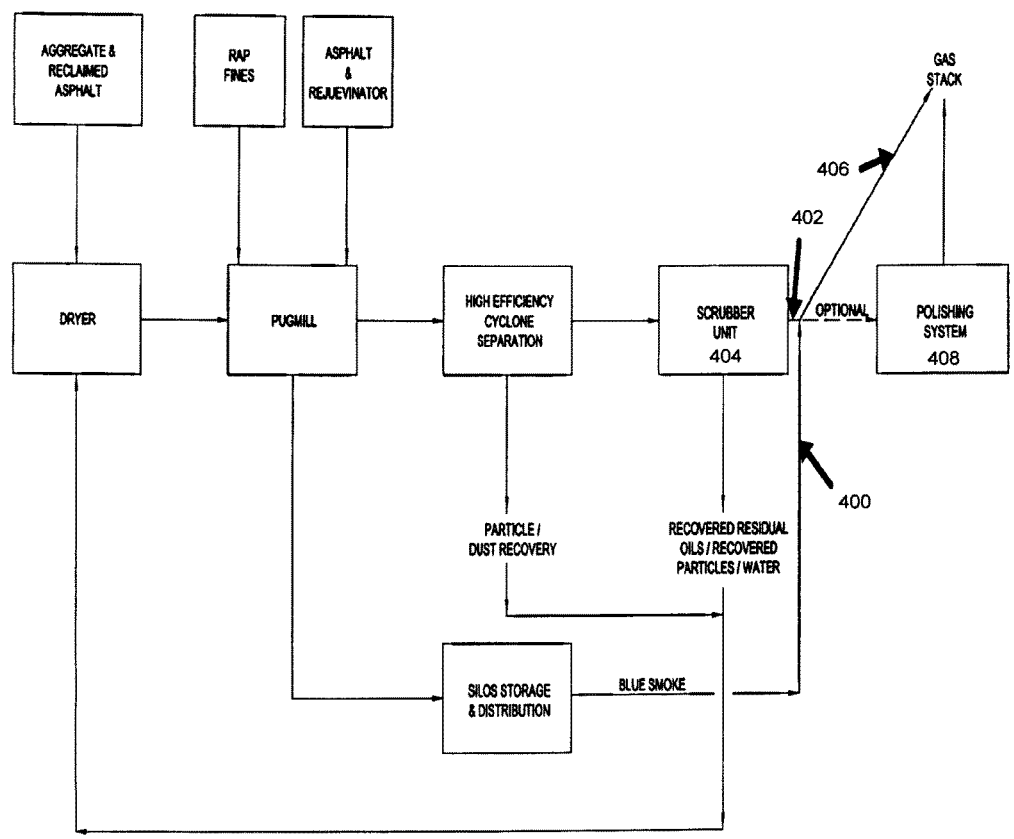
FIG. 4 is a flow chart illustrating another alternative embodiment of FIG. 1.

Referring now to FIG. 4, the system alternatively provides a Blue Smoke capture system that merges Blue Smoke emissions 400 into the gas stream 402 leaving the scrubber 404 and then processed along with the scrubber exit gas 406 through the polishing filter 408. Adding the cool Blue Smoke air flow to the scrubber exit gas provides additional cooling of the gas fed to the polishing filters helping it to cool to a temperature range that is optimal for polishing filter performance.

Figure 5:
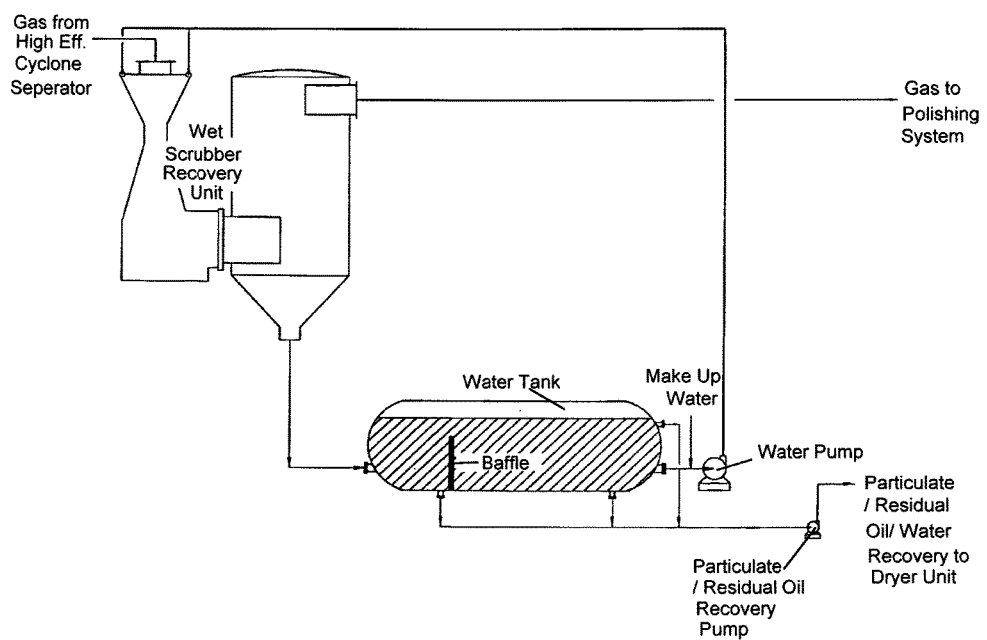
FIG. 5 depicts a Scrubber Unit for use in the High Recycle/Reclaimed Asphalt process.
Figure 6:
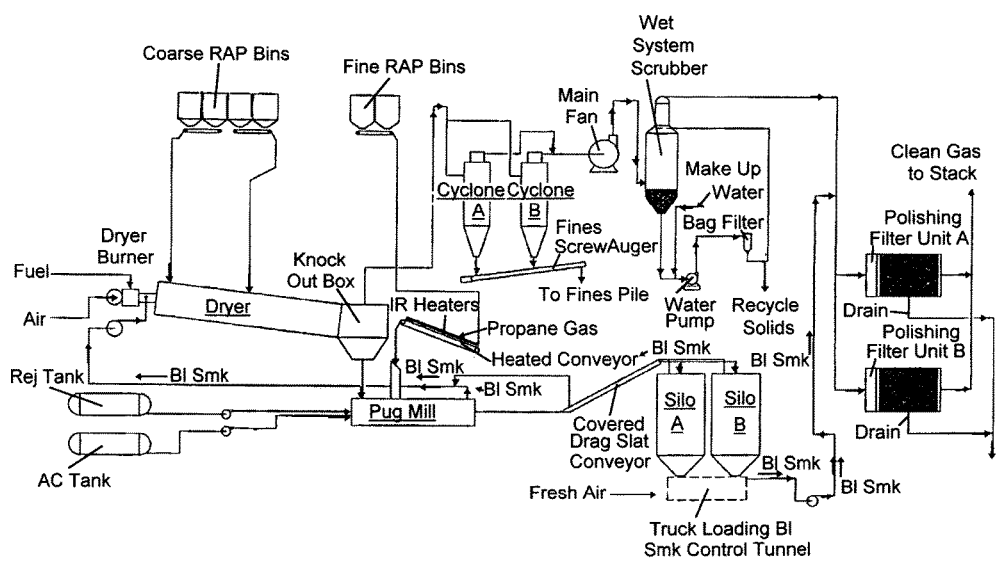
FIG. 6 is a schematic of an embodiment of the High Recycle/Reclaimed Asphalt HMA system.

As shown in FIGS. 5 and 6, the wet scrubber unit provided in the system inherently cools the hot gas stream while removing dust/particulates and oil residue with the scrubber's water stream and then, recycled back into the main dryer process. The cyclone system recovery is also recycled back into the main process. This also allows for the ease of use of a polishing filter (or other polishing technology) to remove any residual oil droplet residue. Alternatively, an oxidizer can be used instead of a polishing filter. It should be noted that depending on the emissions criteria the scrubber technology may not require the additional polishing step to remove the remaining residue oil.

The scope of the invention is not limited to the specific embodiments described herein. Rather, the claim should be looked to in order to judge the full scope of the invention.

What is claimed is:

1. A system for treating waste emissions generated during the production of high recycle/reclaimed hot mix asphalt comprising:
   a hot mix asphalt processing system, including;
      a dryer including an inlet for receiving material for processing, an outlet for removing dried material, and an inlet for receiving water and waste materials from a scrubber recycle stream; and,
      a pugmill including an inlet for receiving material from the dryer, a material outlet for removing material from the pugmill, and an emissions outlet for removing waste emissions produced during processing of the material;
      a cyclone separator including an inlet for receiving waste emissions from the hot mix asphalt processing system, and a particulate outlet for transferring recovered particulate waste from the cyclone separator into the scrubber recycle stream, and an emissions outlet for transferring emissions separated from the particulate waste with the cyclone separator; and,
      a wet scrubber including an inlet for receiving emissions from the cyclone separator, and a waste outlet for transferring scrubber water and particulate and liquid waste recovered from the wet scrubber into the scrubber recycle stream, and an emissions outlet for releasing scrubbed gas emissions through a gas stack;
      wherein, the water and waste material transferred into the scrubber recycle stream the from the cyclone separator and the wet scrubber, is returned into the dryer through the scrubber recycle stream inlet.

2. The system of claim 1, further comprising a polishing system positioned between the wet scrubber and the gas stack, wherein the polishing system includes an inlet for receiving scrubbed emission from the wet scrubber, and an outlet for releasing polished gas emissions through the gas stack.

3. The system of claim 1, further comprising a silo aligned to receive processed material from the pugmill material outlet.

4. The system of claim 3, further comprising a blue smoke capture system which collects and merges the blue smoke emissions released from the processed material stored in the silo, with the gas emissions released through the scrubber emissions outlet.

5. The system of claim 1, further comprising a conveyor positioned to convey material for processing into the dryer through the dryer inlet.

6. The system of claim 5, wherein the scrubber recycle stream is directed onto the conveyor.

7. The system of claim 1, wherein the cyclone separator is a two stage separator.

8. The system of claim 1, further comprising a fines feed conveyor to convey asphalt fines to the pugmill inlet.

9. The system of claim 8, further comprising an infrared heater mounted above the conveyor.

10. A method of making high recycle/reclaimed hot mix asphalt comprising the steps of:
    drying coarse recycle/reclaimed asphalt containing asphalt binder oil, within a dryer;
    combining the dried coarse recycle/reclaimed asphalt and asphalt binder mixture with materials including reclaimed asphalt fines, within a pugmill;

collecting waste emissions released during the processing of the hot mix asphalt materials and transferring them into a cyclone separator;

transferring the processed hot mix asphalt materials from the pugmill into a storage silo;

separating particulate waste from gas emissions and releasing the particulate waste into a scrubber recycle stream;

transferring the gas emissions from the cyclone separator into a wet scrubber;

separating water particulate and liquid waste materials from the gas emission with water within the wet scrubber;

transferring the scrubber water and particulate and liquid waste materials recovered with the wet scrubber, into the scrubber recycle stream; and directing the water and recovered waste material from the scrubber recycle stream into the dryer, wherein the water and recovered waste material coats coarse, high reclaimed asphalt as it enters the dryer.

11. The method of claim 10, wherein the reclaimed asphalt fines are additionally introduced in the dryer.

12. A method of processing waste emissions produced during the production of high recycle/reclaimed hot mix asphalt comprising the steps of:

collecting waste emissions released during the processing of high recycle/reclaimed hot mix asphalt within a hot mix asphalt processing system;

separating particulate waste materials from gas emissions with a cyclone separator;

further separating liquid and particulate waste materials from gas emission with water within a wet scrubber; and, returning the water and liquid and particulate waste materials back into the hot mix asphalt processing system through a scrubber recycle stream.

13. The method of claim 12, further comprising directing gas emissions through a polishing system released by the wet scrubber.

14. The method of claim 12, wherein the cyclone separator is a two stage separator.

* * * * *